United States Patent [19]

Chavel et al.

[11] 4,351,589
[45] Sep. 28, 1982

[54] METHOD AND APPARATUS FOR OPTICAL COMPUTING AND LOGIC PROCESSING BY MAPPING OF INPUT OPTICAL INTENSITY INTO POSITION OF AN OPTICAL IMAGE

[75] Inventors: Pierre H. Chavel; Alexander A. Sawchuk, both of Los Angeles; Bernard H. Soffer, Pacific Palisades; Timothy C. Strand; Armand R. Tanguay, Jr., both of Los Angeles, all of Calif.

[73] Assignee: Hughes Aircraft Company, Culver City, Calif.

[21] Appl. No.: 138,672

[22] Filed: Apr. 8, 1980

[51] Int. Cl.³ .................. G02F 1/29; G02F 1/00; G06F 7/56
[52] U.S. Cl. ......................... 350/342; 350/335; 350/348; 350/388; 364/713
[58] Field of Search ......... 350/335, 342, 348, 162 SF, 350/356, 388, 380–383; 365/108–109, 124, 215; 364/713, 822

[56] References Cited

U.S. PATENT DOCUMENTS

| | | | |
|---|---|---|---|
| 3,941,455 | 3/1976 | O'Brien | 350/342 |
| 4,052,705 | 10/1977 | Schaefer et al. | 364/713 |
| 4,272,157 | 6/1981 | Collins, Jr. et al. | 350/342 |

OTHER PUBLICATIONS

Pollack et al., "A Low-Noise Image Amplifier", Conf. SID Inter. Symposium, Digest of Tech. Papers, 1976, pp. 141–144.
Tsvetkov et al., "Picture Logic & Liquid Crystals", Sov. Jr. of Quantum Electronics, 2-1975, pp. 989–993.
Goldberg et al., "Integrated Optical Half Adder Circuit", App. Optics, 6-1979, pp. 2045–2051.
Collins et al., "Numerical Optical Data Processing", Conf. Proc. 1978 Intern. Optical Computing Conf., 1978, pp. 194–197.

*Primary Examiner*—William H. Punter
*Attorney, Agent, or Firm*—E. F. Oberheim; W. H. MacAllister; A. W. Karambelas

[57] ABSTRACT

Arrangements and methods are described employing input optical intensity to output spatial position mapping, for performing optical computing or logic processing functions. An electro-optical device which receives discrete input optical object beams of different intensity levels and a separate readout optical beam, diffracts portions of the readout optical beam to unique spatial positions in two dimensional space, each portion as a function of the intensity of individual discrete input beams or of combinations of the intensities of the input beams. A spatial filter having discrete apertures at selected ones of the unique spatial positions transmits the selected diffracted optical outputs for implementing logic or computing functions.

14 Claims, 18 Drawing Figures

| | | | | | | | | | | | | | | | |
|---|---|---|---|---|---|---|---|---|---|---|---|---|---|---|---|
| 1 | 1 | | 0 | 0 | | 0 | 1 | | 0 | 1 |
| 1 | 1 | | 0 | 1 | | 1 | 1 | | 1 | 0 |

TRUE      AND      OR      XOR

METHOD AND APPARATUS FOR OPTICAL COMPUTING AND LOGIC PROCESSING BY MAPPING OF INPUT OPTICAL INTENSITY INTO POSITION OF AN OPTICAL IMAGE

This invention was developed in the performance of work under Government Grant AFOSR 723285 (NSC) and under Government Contract F49620-77-C-0080 (HAC). Under the provisions of ASPR 7-302.23 (b) a confirmatory license has been granted to the Government.

BACKGROUND OF THE INVENTION

1. Field of the Invention

This invention relates generally to an optical computing method or process and to devices and systems for practicing such method. More particularly, this invention relates to optical methods and arrangements for converting optical intensity to position mapping for performing digital logic functions.

2. Description of the Prior Art

Reference may be had to "Optical Logic and Optically Accessed Digital Storage" by Rolf Landauer in *Optical Information Processing*, Y. E. Nesterikhin et al., ed., Plenum Press, 1976, pp. 219–253, for some general background with respect to optical arrangements for performing logic functions.

Fiber and integrated optics logic are treated by H. F. Taylor, "Guided Wave Electro-Optic Devices for Logic and Computation", Applied Optics, 17, pp. 1493–1498 (May 15, 1978), and by Lew Goldberg and Sing H. Lee, "Integrated Optical Half-Adder Circuit", Applied Optics, 18, pp. 2045–2051 (June 15, 1979). Unlike the present invention, these systems do not embody parallel processing, they are hard-wired, and are not readily reprogrammed.

David H. Schaefer and James P. Strong, III, in a paper entitled "Tse Computers", proceedings of IEEE, 65, pp. 129–138 (January 1977), describe an arrangement consisting of an array of optical detectors and sources coupled by electronic logic circuits. These arrays are coupled by optical fibers. There are severe difficulties manufacturing the circuit arrays.

Ravindra A. Athale and Sing H. Lee, in a paper entitled "Development of an Optical Parallel Logic Device and a Half-Adder Circuit for Digital Optical Processing", Optical Engineering, 18, pp. 513–517 (1979), describe a liquid crystal device and demonstrate an 8×8 AND gate using parallel logic and control provided by a photoconductor matrix. The approach discussed here as well as that of the Tse computer share the limitations of integrated optics in that presently only simple gates can be implemented directly and the functions cannot be programmed.

Kendall Preston, Jr., in Chapter 8 of *Coherent Optical Computers*, McGraw-Hill, New York, 1972, and C. C. Guest and T. K. Gaylord, in a paper entitled "Two Proposed Holographic Numerical Optical Processors", *SPIE Proceedings on Optical Processing Systems*, Vol. 185, pp. 42–49, have proposed holographic optical processing schemes. In these, extreme alignment accuracy and stability are required.

All of the above systems (excepting Tse) have a level restoring problem. One beam propagates through the entire system. Noise and attenuation accumulate. In such arrangements repeaters may offer a solution to such system problems but these are difficult to fabricate and only further complicate the system.

In accordance with presently preferred embodiments of this invention, a variable grating mode liquid crystal device is utilized to provide optical intensity to position mapping. Such devices may operate in a transmissive mode or in a reflective mode for readout purposes depending upon their construction. Although the variable grating mode liquid crystal device is not discussed therein, reference may be had to U.S. Pat. No. 3,824,002 to Terry Beard, assigned to Hughes Aircraft Company, for general information on the construction and operation of a liquid crystal light valve which operates in the reflective mode. In a reflective mode device, the optical input is applied to one side of the liquid crystal light valve and the readout light beam is applied to the other side. In a liquid crystal device which operates in the transmissive mode, both of the writing and the readout beams are applied to the same side of the liquid crystal device.

SUMMARY OF THE INVENTION

This invention provides a method and apparatus having provisions for optical intensity to position mapping and for utilizing such position information in developing digital logic computers or processors.

In one of its aspects this invention provides a method of optical computing wherein the intensity of an input optical object is utilized in controlling the spatial position of an output optical image. Thereafter a selected portion of the output optical image is spatially filtered and transmitted for performing at least a selected one of imaging, translating and Fourier Transform functions.

In another of its aspects this invention provides an optical transducer responsive to an input optical object for controlling a readout beam to produce an output optical image having a spatial position which is a function of the intensity of the input optical object. A spatial filter selects positions of the output optical image for transmission for imaging and other functions. In addition, the invention is a fully parallel processor which operates on optical object intensities. Although the concept of this invention can be implemented with any device that provides simple mapping of optical intensity into position of an optical image, the arrangement described herein utilizes a liquid crystal light valve. Provision is made for operating the liquid crystal in what is called a variable-grating mode. This is a mode in which a locally variable phase grating is produced. By way of explanation, if a photoconductor and a liquid crystal structure are sandwiched between transparent conductive electrodes to which a dc voltage is applied, local illumination variations of the photoconductor are transformed into local period changes in the liquid crystal material. It is desirable that liquid crystal materials be chosen in which the local period is proportional to the locally applied voltage to provide a linear relationship between spatial position of the output optical image and input illuminance. In such a structural arrangement of the liquid crystal cell, the photoconductor and the liquid crystal function as a voltage divider to control the voltage applied to the liquid crystal as a direct function of the illuminance or intensity of an input object. It is evident that input objects by their intensity can control the direction and magnitude of output beam diffraction. The device described may be characterized as a variable grating mode device embodying as essential elements, a photosensitive device and a variable grating mode liquid crystal cell.

In systems for the implementation of logic operations, the variable grating mode device functions as the input transducer. The intensities of two or more optical input objects produce respective unique liquid crystal gratings. Whether the variable grating mode device is transmissive or reflective in character, a separate readout optical beam is employed. The diffraction of the readout beam is a function of input object intensity. The system includes a spatial filter having one or more simple slit apertures. Partially transmitting apertures may be used. Thus, a spatial filter may comprise a single slit aperture located to intercept an output beam centered at a liquid crystal grating bias frequency corresponding to a condition of no optical input to the photoconductor, or, a single slit centered at a liquid crystal grating bias frequency corresponding to any selected input object intensity, or, a combination of the intensities of more than one input object, or, may comprise pluralities of spaced slit apertures for performing logical operations, such as the addition of optical binary representations when one such optical representation may include a binary carry.

Using the elementary variable grating mode logic system and employing two optical input objects of differing intensities, representing binary "1" and binary "0", all of the logical functions NOT, AND, OR, XOR, and their complements can be implemented with a single variable grating mode logic system, by merely altering the Fourier plane spatial filter, mechanically or electro-optically. Furthermore, additional superimposed optical inputs to a given variable grating mode cell are easily accommodated so that the logical functions can be extended to multiple inputs, for example, for implementing a four input NAND gate. More complex logical functions are described in the detailed description hereinbelow.

An object of this invention is to provide an improved method and apparatus for optical computing.

An object of this invention is to provide an improved electro-optical device to provide position mapping of the intensity of an optical input.

More particularly, it is an object of this invention to provide an improved liquid crystal cell having a grating of locally variable period in an arrangement for utilizing such an effect for diffracting an optical readout beam as a direct function of the optical intensity of an optical input.

In another of its aspects it is an object of this invention to provide an electro-optic system for performing digital logic operations utilizing optical intensity to position mapping.

BRIEF DESCRIPTION OF THE DRAWINGS

These and other objects and advantages will become apparent from a study of the following specification when considered in conjunction with the accompanying drawings in which:

FIGS. 6a, b, c and d are respective truth tables depicting two-input logic operations;

FIG. 7 is a schematic implementation using conventional drawing notation of one sum bit of a full adder using NOT and NAND gates. The inputs are A and B and the carry bit is C;

FIG. 9b graphically depicts a Fourier plane, indicating spatial frequencies associated with each possible input for the two-input binary system with orthogonal variable grating mode cells as depicted in FIG. 9a;

DETAILED DESCRIPTION OF THE INVENTION

Figure 1:
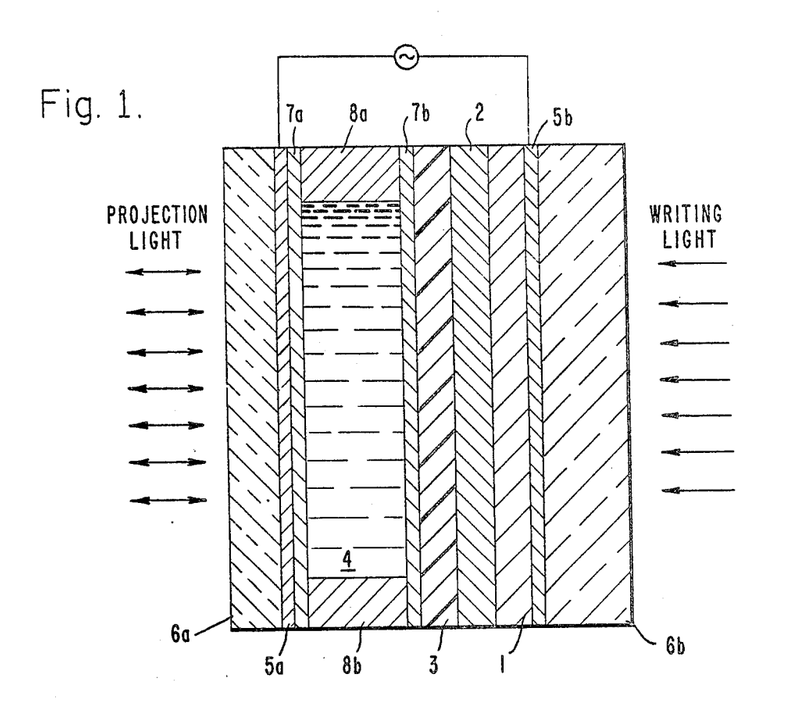
FIG. 1 is an enlarged cross-sectional view of a variable grating mode liquid crystal device of a type which may be employed in practicing this invention.

A typical liquid crystal cell is illustrated in FIG. 1. The liquid crystal structure is a layered configuration of thin films or layers comprising a photosensitive device such as a photoconductor 1, a light blocking layer 2, a partially conducting dielectric mirror 3 and a liquid crystal layer 4. These layers are sandwiched between transparent conductive electrodes 5a and 5b that have been deposited on glass substrates 6a and 6b. The liquid crystal cell structure comprises thin films of quartz 7a and 7b separated by spacers 8a and 8b. In utilizing this general structure of a liquid crystal device as a variable grating mode device, a dc drive voltage is applied across the transparent conductive electrodes 5a and 5b. The liquid crystal cell thin film structure comprising layers 1, 2, 3 and 4 is designed to accept most of the drive voltage when the photoconductor is not illuminated. When light falls on the photoconductor, the photoconductor's impedance drops thereby switching more of the voltage from the photoconductor onto the liquid crystal. Thus, the photoconductor acts as a light activated voltage gate. The thin films are selected to have high lateral impedance to minimize spreading of the light or of the associated liquid crystal electro-optic effect. As a result, the light activation process is a high resolution process, approximating the grating period.

Liquid crystals exhibit domain structures. These are particularly evident when the liquid crystal is in the form of a thin film or when it is sandwiched between planar electrodes. For example, a domain structure which manifests itself by the periodic reorientation of the optical axis of the liquid crystal, may be seen when no external electric or magnetic fields are applied, or when electro-hydrodynamic or magneto-hydrodynamic instabilities are induced by a field. In particular, devices have been constructed wherein a nematic-phase liquid crystal sandwiched between electrodes spaced 12 micrometers or less with an electric field normal to the electrodes, exhibited domains that appeared as parallel structures. These domains extended along the direction of quiescent state alignment of the liquid crystal on the electrode surface, this alignment having been induced by rubbing or other appropriate methods such as the etch-alignment method. These domains have the unique property that they can act as phase diffraction gratings, the grating constant being a function of the applied voltage. Alignment techniques are discussed in U.S. Pat. Nos. 4,022,934; 4,030,997 and 4,153,529. The domains for static fields are usually parallel to the quiescent-state alignment on the electrode surface. Studies of photomicrographs of a variable grating mode cell taken through a polarizing microscope indicate the predominant apparent effect is a decrease in the period of the phase grating as voltage increases. Studies of diffraction patterns indicate that diffraction of the readout light beam is a direct function of the intensity of the input light beam.

When the light valve includes the partially conducting dielectric mirror 3, it is a reflective unit. If the light valve does not include the dielectric mirror 3 and the light blocking layer 2, it is a transmissive unit.

With a reflective mode liquid crystal device as depicted in FIG. 1, the writing light is applied at the right side of the cell, as indicated, and illuminates the photoconductor. Projection or readout light is applied from the left side, passes through the liquid crystal material and is reflected from the partially conducting dielectric mirror. Thus, the projection light is bidirectional as indicated.

Assuming a transmissive liquid crystal device, both writing and reading light is applied at the photoconductor side of the cell. The writing light has a frequency which activates the photoconductor and the reading light is at a frequency to which the photoconductor is insensitive. In the transmissive mode, the readout light passes through the liquid crystal cell and exits on the left side as viewed.

In either situation, the writing light determines response of the device and the separate reading light or projection light as it exits the liquid crystal cell characterizes the condition of the cell as a result of the effect of the writing light on the photoconductor and hence the liquid crystal material.

The variable grating mode liquid crystal phenomenon occurs in certain liquid crystal materials. Research has been conducted with high resistivity ($\rho > 10^{10}$ $\Omega$cm) pure liquid crystal compositions in combination with high impedance photoconductor layers such as zinc sulphide photoconductors. Typical liquid crystal materials which exhibit satisfactory or acceptable variable grating response characteristics for present purposes include, by way of example but not limitation, those which are generically called Azoxy Benzene and sold under the trade name MERCK NV, which are:

(1) Mixture of Permethoxy, 4 methoxy, 4' butyl, azoxy benzene and its isomer; and
(2) Mixture of Permethoxy, 4 methoxy, 4' ethyl azoxy benzene and its isomer.

Photosensitive charge coupled devices or layer structures may be substituted for the photoconductor to provide discrete area inputs for controlling the liquid crystal diffraction grating. Imaging and scanning techniques for such charge coupled devices are well known.

The results of this and related research efforts indicate that a variable grading mode liquid crystal device is a viable device for optical intensity to position mapping.

Figure 2:
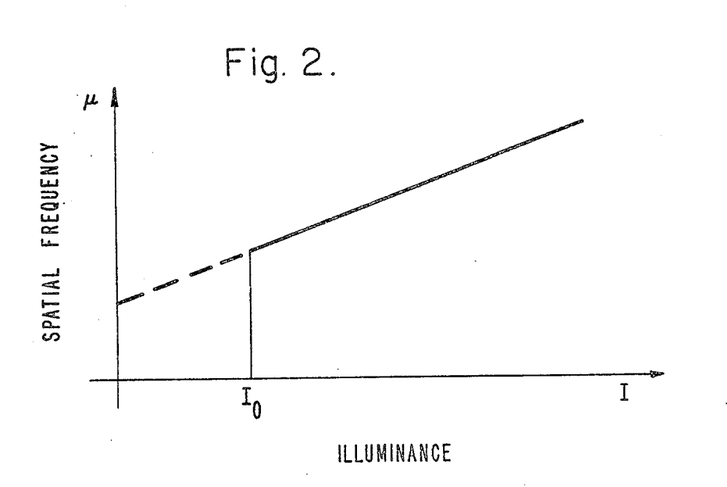
FIG. 2 is a graph depicting the characteristic response of a variable grating mode liquid crystal, plotting spatial frequency against input illuminance.

With an arrangement of the type described optical intensities can be position mapped, within the dynamic range of the device, monotonically into positions along a line in Fourier space by an optical transform. The spatial positional information of the output optical image as it leaves the liquid crystal is coded into phase and side bands in two dimensional Fourier space. A new parameter, the optical input intensity, has thus been coded into Fourier space. Since the periods of the variable grating of the liquid crystal material are much finer than the periods encountered in the optical objects to be processed, a tractable situation exists, familiar in communications, where the carrier frequency is higher than the modulation frequencies. FIG. 2 depicts a typical response of a variable grating mode liquid crystal cell plotting spatial frequency against input illuminance.

Figure 3:
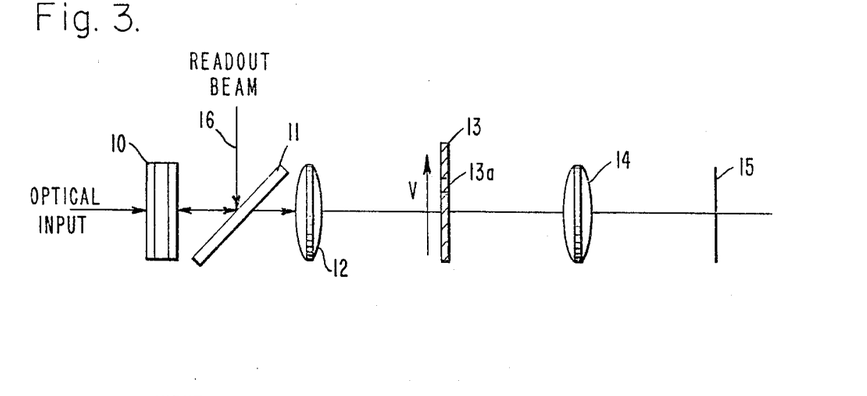
FIG. 3 depicts an elementary variable grating mode system for performing optical logic.

All Boolean logic expressions can be written with two operations: NOT and either AND or OR. It is possible to demonstrate these operations using variable grating mode liquid crystal cell systems. Therefore, all combinatorial logic operations in principle can be implemented. Other more complicated operations can also be directly performed. FIG. 3 illustrates an elementary variable grating mode logic device. The structure, by way of example, comprises a reflective-type of variable grating mode liquid crystal device generally designated 10. In all of the illustrations in this descriptive disclosure, a representation of a reflective mode liquid crystal device is shown. It will be understood, however, that any device providing optical intensities to position mapping may be used including the transmissive type of liquid crystal device, as discussed hereinabove in connection with FIG. 1. Continuing with the description of FIG. 3, the system further comprises a partially reflecting mirror 11 disposed at an angle along the optic axis, a lens or lens system 12, a spatial or Fourier filter 13 having a slit 13a therein, a lens or lens system 14, and an output member 15 having an image surface for receiving the output beam. Other well-known configurations to perform Fourier filtering may be used. The output member 15 may provide a surface for display purpose only, or, may be any instrumentality capable of responding to impinging optical energy at a specific location in the image plane. Examples include, a screen, another variable grating mode system, or a photodetector or film.

Recalling briefly the structure of the variable grating mode device functioning as the input transducer, it comprises a variable grating mode liquid crystal cell sandwiched with a photoconductor. A partially conductive reflective film separates the two elements of the structure as shown in FIG. 1. The variable grating mode device is biased electrically by a voltage, although optical biasing is also possible. With no input to the photoconductor, a liquid crystal grating exists having a period which may be expressed as a bias frequency, $f_o$. When a non-zero optical input is applied to any region of the photoconductor, the fundamental grating frequency increases to $f_l$. That is, $f_l = f_o + \Delta f$, in which $\Delta f$ corresponds to the input optical intensity. The variable grating mode device is readout using a separate readout beam 16. This readout beam is reflected from the surface of the partially reflecting mirror 11 through the liquid crystal device where it is reflected from the dielectric mirror as the output optical image passing through the partially reflecting mirror 11 and lens or lens system 12 to the spatial filter 13. Disposition of the slit aperture 13a to transmit that position of the output optical image corresponding to the selected intensity level of the input optical object, permits imaging and/or utilization of that optical information at the output member 15. If a single binary input object is imaged onto the photoconductor, an output that is the complement of this input is generated by using a single slit centered at the frequency $f_o$ in the Fourier plane. This filter will transmit the output optical image in those regions where the optical input is zero. However, no light will be transmitted in regions where there is a non-zero optical input intensity, i.e., frequency regions where the variable grating mode frequency has been increased to $f_1$. The optical output image intensity thus takes on the binary values "0" or "1" (the "1" level being determined by the strength of the readout beam) and corresponds to the logical NOT of the binary input.

Figure 4A:
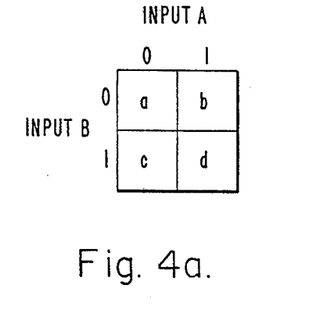
FIG. 4a is a representation of an arbitrary two-input binary truth table.
Figure 4B:
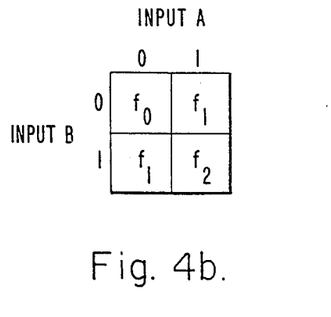
FIG. 4b is a similar truth table indicating the variable grating mode frequencies associated with the differing inputs.
Figure 5:
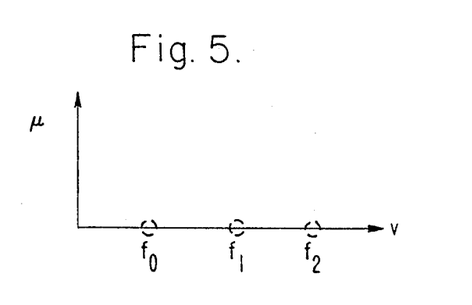
FIG. 5 is a plot depicting the spectral frequency components of the variable grating mode patterns generated by bias voltage or bias illumination acting on the liquid crystal cell and two binary inputs.

Given two binary inputs, there are in general four possible input combinations as indicated by states "a", "b", "c" and "d" in the arbitary truth table of FIG. 4a. The truth table of FIG. 4b indicates the variable grating mode frequencies associated with various optical input object intensities. This indicates that any truth table with "b"="c" can be implemented directly by the variable grating mode liquid crystal device technique. If these two optical input objects are imaged (superimposed) onto the variable grating mode liquid crystal cell, three distinct optical intensity levels are produced. Thus, three different variable grating mode spatial frequencies are produced corresponding to the cases where both inputs are zero (state "a"), only one input is non-zero (states "b" and "c"), and both inputs are non-zero (state "d"). This is indicated in FIG. 5, showing plots of the spectral components of the variable grating mode patterns generated by a bias or drive voltage. By using slit apertures to transmit any one, or any combination of these three spatial frequencies, it is possible to implement any logic operation represented by a truth table where state "b" equals state "c". The possible logic operations are listed and shown schematically in the truth tables of FIGS. 6a, 6b, 6c and 6d. Thus, an AND function is implemented by positioning a slit to transmit an output optical image at spatial frequency $f_2$ which is generated only in those parts of the image where both inputs have the binary value "1". The XOR operation is obtained by transmitting only an optical image at spatial frequency $f_1$, and the OR function is achieved by transmitting optical images at both frequencies $f_1$ and $f_2$.

Two important aspects of this approach to logic are mentioned at this point. First, the output levels are essentially determined only by the readout beam intensity and the filter transmittance. Assuming well-defined diffraction orders, the output will be binary with levels which can be precisely controlled independently of small variations in the input. Thus, the system has level restoring capabilities which are essential if there is a need to cascade devices. Secondly, the output can be made identical in form (wavelengths, intensity levels, etc.) to the input. This is also essential to cascading. Features such as these have been missing in prior art arrangements.

Figures 6A, 6B, 6C, 6D, 7:
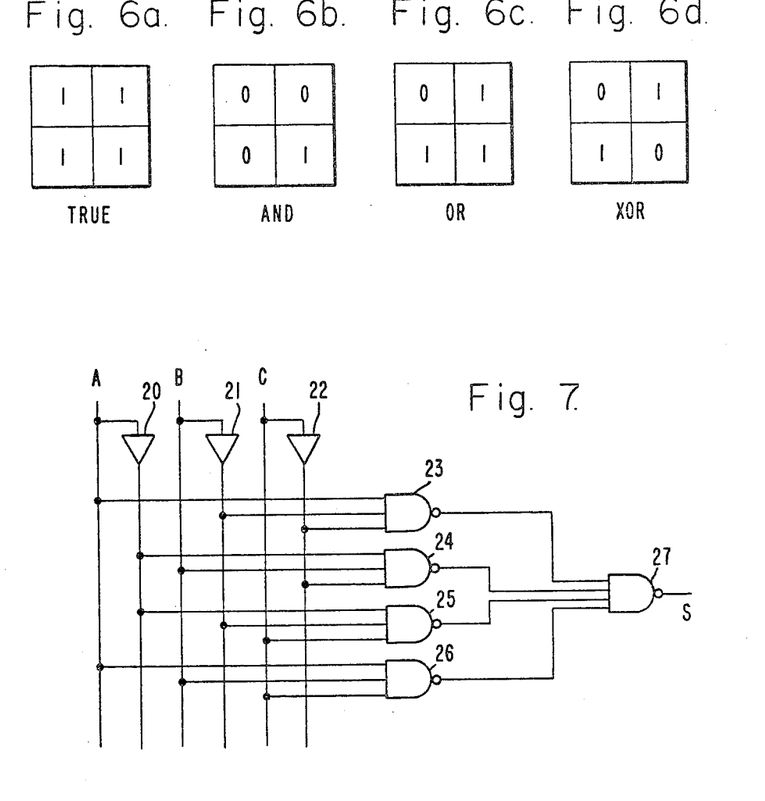

From the foregoing, it will be evident that the logic functions shown in the truth tables of FIG. 6, AND, OR, XOR (and their complements) can be implemented with a single variable grating mode device by merely altering the Fourier plane filter. Furthermore, additional superimposed inputs to a given variable grating mode device can be easily accommodated so that the logic function can be extended to multiple inputs to achieve logical function such as the four input NAND function.

Having demonstrated the NOT function and the AND function with a variable grating mode system as illustrated in FIG. 1, and observing that the variable grating mode logic systems can be cascaded, an arbitrarily complex logic function can be implemented. Ordinarily, it is desirable to maximize processing speed and minimize system complexity which makes it important to be able to implement complex operations with the smallest possible number of cascaded stages. One example is the implementation of the sum bit in a full adder. A reduced implementation using only NOT and NAND gates is shown in FIG. 7. At this point, for the purposes of discussion, the illustration of FIG. 7 is developed using conventional drawing notation techniques for the NOT and NAND gates. In FIG. 7, there are eight gates in three cascaded stages, the first stage includes three NOT gates 20, 21 and 22. The second stage includes four, three-input NAND gates 23, 24, 25 and 26 and the third stage includes a four-input NAND gate 27. The direct implementation of this function using cascaded variable grating mode NOT and NAND systems would be very complicated, but the flexibility of the variable grating mode approach permits the implementation of such a full adder as a single stage device.

Figure 8:
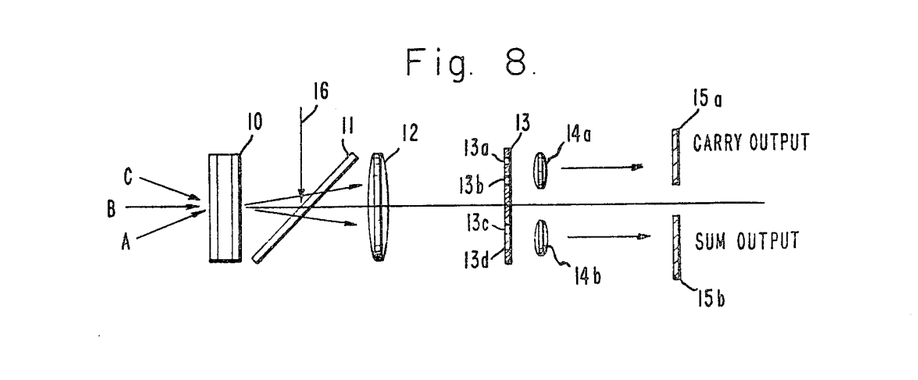
FIG. 8 depicts a full adder which produces sum and carry bit planes, using one variable grating mode device, according to the principles of this invention.

FIG. 8 illustrates one possible direct variable grating mode system implementation of a full adder, using only one variable grating mode device. As seen in FIG. 8, the direct variable grating mode implementation requires superimposing three binary optical input objects A, B, C on the input photoconductor. This system again includes the partial mirror 11, the lens system 12, the filter 13 and the output member 15. In this case, however, the filter is provided with slits 13a, 13b, 13c and 13d, for purposes which will be described. For the case of the three distinct binary inputs, four distinct spatial frequencies can be generated. These are the bias frequency $f_o$ occurring when all inputs are at optical intensity levels corresponding to logic level "0", frequency $f_1$ occurring when one input corresponds to logic level "1", frequency $f_2$ occurring when exactly two inputs correspond to logic level "1", and frequency $f_3$ occurring when all three inputs correspond to logic level "1". Since each distinct frequency corresponds to having a different number of non-zero inputs, the system can be used to implement, in one step, any logic operation which only depends upon knowing the number of inputs and not their order. The logic associated with generating the sum and the carry bits of a full adder is an example of this type of operation. With reference to FIG. 8, the sum bit should be "1" whenever exactly one optical input is on, or when all three optical inputs are on. This operation is easily implemented by placing slits at frequencies $f_1$ (one input on) and $f_3$ (three inputs on) in the filter plane 13 of the variable grating mode logic processor. The carry bit can be easily generated by placing slits at frequencies $f_2$ and $f_3$. In fact, both the sum and carry bits can be generated by one device by using the positive spatial frequencies for the sum bit and the negative spatial frequencies for the carry bit and using optical systems comprising prisms, lenses 14a and 14b or mirrors and output members 15a and 15b to spatially separate the outputs. In FIG. 8, this is achieved by using a spatial filter 13 having slits 13a and 13b transmitting frequencies $f_2$ and $f_3$, respectively, in the negative frequency half-plane. Since the sum output is "1", this is obtained by transmitting frequencies $f_1$ and $f_3$ at slits 13c and 13d, respectively, in the positive frequency half-plane. It is evident that this system can be used to produce sum and carry bits for a full adder which accommodates n summands in one stage whereas the conventional logic approach requires additional devices and/or cascaded stages for any additional summands.

It is apparent that the variable grating mode logic system is very flexible in its ability to implement many logic operations in a single step which would normally have required many cascaded stages. However, in general for a system with n binary inputs there are $2^{(2^n)}$ possible logic operations ($2^n$ possible input states each of which can be assigned two possible outputs) whereas the simple variable grating mode processor described above can be programmed to produce $2^{(n+1)}$ different operations (n+1 distinguishable input states each of which can be assigned one of two possible outputs).

Although some operations cannot be implemented in a single operation, they can always be implemented in a multi-stage system. This restriction can be overcome at least for cases where n is small. In order to accomplish this, it is necessary to have a means for distinguishing the different inputs. There are a number of ways of doing this. The most straightforward approach is to assign a different pair of intensity levels to the logic levels of each input object. Thus, each input object generates a different pair of spatial frequencies which can be isolated in a filter plane of the processor. In assigning input optical intensity levels, it is necessary to insure that all possible input combinations produce unique spatial frequencies.

A second approach for distinguishing various optical input objects is to have a separate variable grating mode device for each input object and assign different grating orientations, different biases and/or different gains to each device.

Figure 9A:
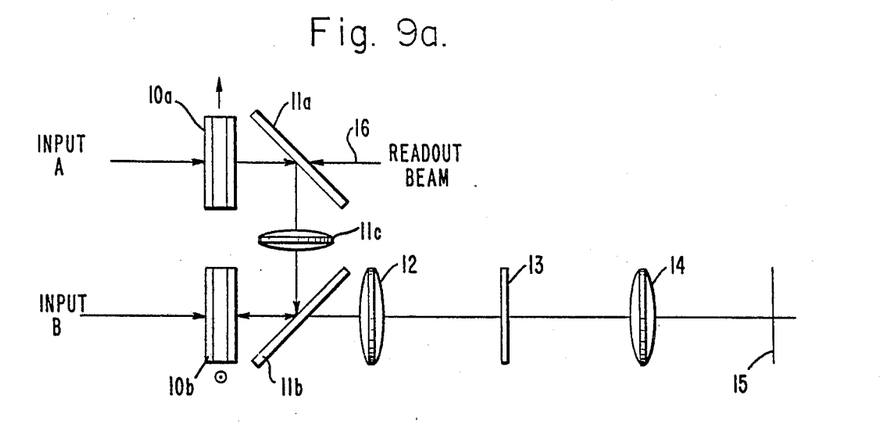
FIG. 9a depicts a matrix addressing arrangement employing two variable grating mode devices with orthogonally oriented grating structures for implementing arbitrary two-input logic.
Figure 9B:
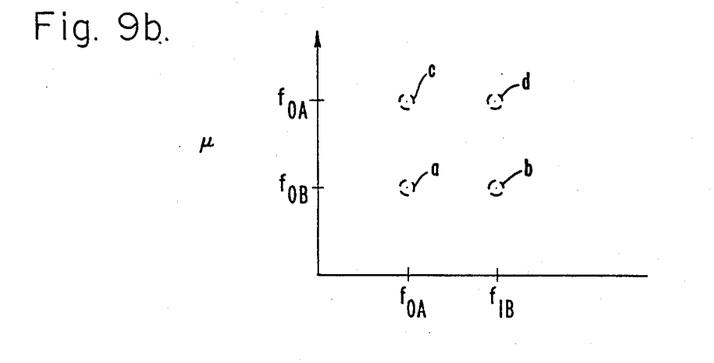

This technique is particularly suited for generalized processing of two inputs. Here a separate variable grating mode device is used for each input and a single readout beam is applied in an optical arrangement in which sequential readout of the device is achieved as shown in FIG. 9a. This effectively causes the two variable grating mode patterns to be multiplied. If the variable grating mode devices are oriented so as to produce orthogonal fringe patterns, the spatial frequencies generated are distributed over a square matrix in the filter plane. FIG. 9a illustrates one possible variable grating mode logic system involving separate variable grating mode transducer inputs. FIG. 9b depicts the spatial frequencies which are distributed over a square matrix in the filter plane. In FIG. 9a variable grating mode liquid crystal devices 10a and 10b receive respective optical inputs A and B. A partially reflecting mirror 11a is disposed in the optical path associated with a device 10a and a partially reflecting mirror 11b is disposed in the optical path of the device 10b. A lens 11c optically couples the partially reflecting mirrors. Sequential interrogation of the cells initiated by an optical readout beam which is projected along the optical axis of the variable grating mode device 10a. The optical output beam leaving the device 10a, having a portion diffracted as a function of the intensity of input A, is reflected by the partially reflecting mirrors 11a and 11b into the variable grating mode device 10b. As in the case of FIG. 3, lens system 12 in the optical path of the variable grating mode device 10b optically couples the output optical image to the filter 13 for projection via the lens system 14 to the output image plane 15. The orthogonal relationship of the grating orientations of the devices 10a and 10b is depicted by the arrow at device 10a and the dot within the circle at the device 10b.

With this arrangement each input combination is associated with a unique spatial frequency of the output optical image. Any possible two-input logic operation can be implemented in one step. This technique can be extended to more than two inputs by applying different bias voltage levels to the different variable grating mode devices. This technique for two inputs also has applications for residue computing as discussed in detail below.

The foregoing disclosure has demonstrated the capability of the variable grating mode system for implementing combinatorial logic. In addition, memory functions and therefore, sequential logic, can also be implemented. To achieve memory with the logic devices described, it is essential to have a feedback loop. Feedback systems have been considered by J. Cederquist and Sing. H. Lee, in a paper entitled "The Use of Feedback in Optical Information Processing", Applied Physics, 18, pages 311-319 (1979). Others have used feedback to implement optical bistable devices and flip-flops. Reference may be made to a paper entitled "Feedback in Analog and Digital Optical Image Processing: A Review" by R. P. Athale and S. H. Lee, SPIE Conference, 1979, to a paper entitled "Optical Feedback for Generating Arrays of Bistable Elements", by S. A. Collins, Jr., U. H. Gerlach and Z. M. Zakman, SPIE Proceedings on Optical Processing Systems, Volume 185, pages 36-41 (1979), and to a paper entitled "Incoherent Mirrorless Bistable Optical Devices", by E. Garmire, J. H. Marburger and S. D. Allen, Applied Physics Letters, 32, 320 (1978). The references aforesaid while differing from the present teachings in significant aspects provide interesting background or general interest with respect to the subject matter of the following aspect of this disclosure.

Figure 10:
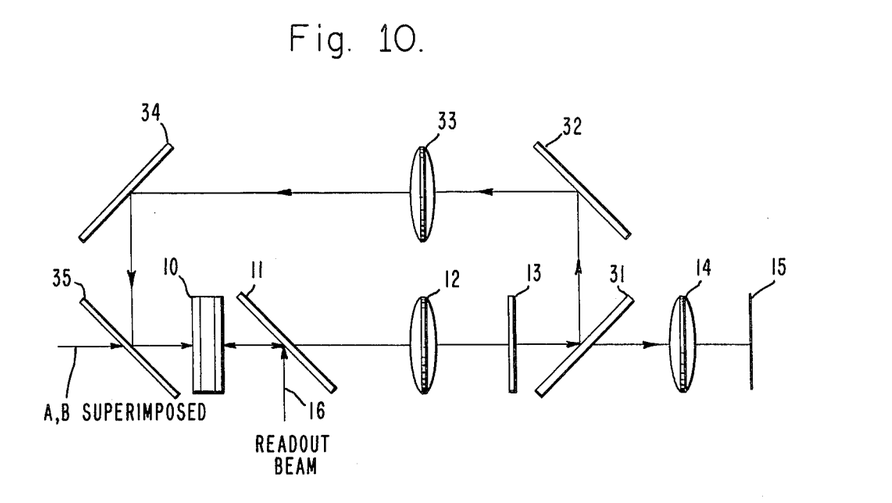
FIG. 10 is an optical logic system employing a variable grating mode device with feedback to produce a bistable system.

FIG. 10 depicts a variable grating mode logic device with one possible implementation of a feedback loop for producing a bistable system. The feedback loop is optically coupled between the output of the spatial filter 13 and the input to the variable grating mode device. In accomplishing this a partially reflecting mirror 31 is disposed in the optical path between the spatial filter 13 and the lens system 14. The mirrors 32 and 34 coupled by a lens system 33 project the output optical image to a partially reflecting mirror 35 at the input to the variable grating mode device. The optical input objects are designated A and B and are superimposed on the variable grating mode device, as indicated. Since the variable grating mode system is a two-dimensional processor, it can be arranged to provide a large number N of independent bistable circuits where N is the space bandwidth product of the system.

Figure 11:
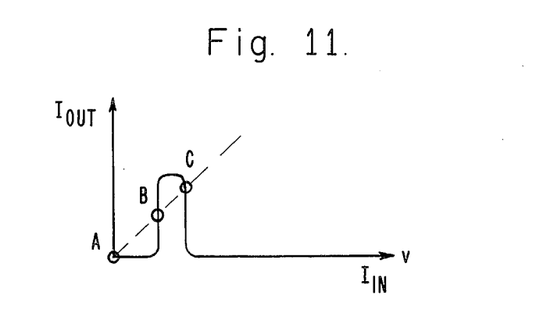
FIG. 11 is a plot depicting the transmission characteristic of a variable grating mode filtering system together with the feedback characteristic of a system such as FIG. 10, to illustrate the three states of the system of which states A and C are stable.

FIG. 11 graphically depicts the bistability of the system. Here the output intensity, as a function of input optical object intensity for a typical system with no feedback, is shown as a solid line. This input-output relation describes non-linearity in the system. If a portion of the output is fed back to the input, a second relationship exists between input and output and this is represented by the dashed line. The feedback system satisfies both of these conditions simultaneously, leading in this particular case to three possible states A, B, and C of which only A and C are stable.

Figure 12A:
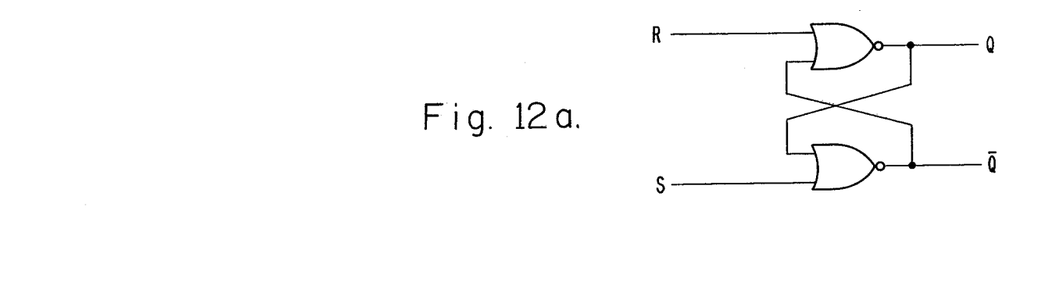
FIG. 12a depicts the logical implementation of an R-S flip-flop using conventional NOR gate drawing notation.
Figure 12B:
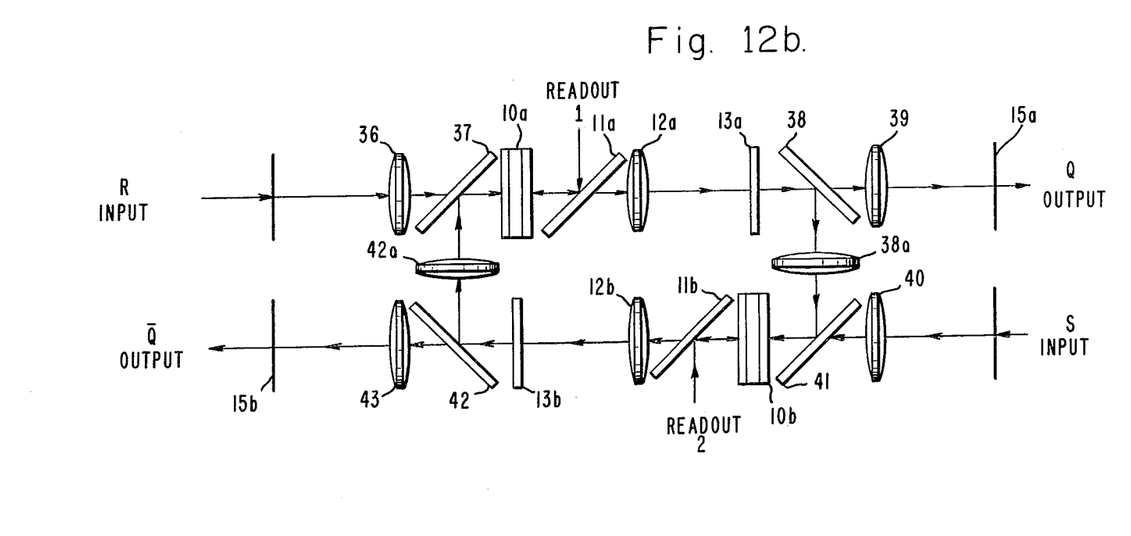
FIG. 12b depicts the implementation of this R-S flip-flop using variable grating mode devices, according to the principles of this invention.

FIGS. 12a and 12b illustrate the application of the feedback theory, described above, in the development of a flip-flop system. The flip-flop selected is a NOR based R-S flip-flop, it being apparent that other normal flip-flop configurations can be implemented. The NOR based R-S flip-flop is depicted in FIG. 12a using standard NOR gate drawing techniques. In this arrangement, the inverted outputs of the NOR gates are cross coupled to the inputs, whence the application of inputs to the respective R-S inputs results in electrical states of the outputs corresponding to the inputs. The variable grating mode logic system which implements an R-S flip-flop as depicted in FIG. 12b utilizes this method of cross coupling of the feedback loops. NOR spatial filters 13a and 13b are arranged in the optical output paths of the respective variable grating mode devices. Partially reflecting mirrors 38 and 42 couple these outputs to lens systems 38a and 42a, respectively, for reflecting the output of one variable grating mode device into the input side of the opposite variable grating mode device. The R and S inputs representing optical signals of predetermined intensity levels are coupled by lens systems 36 and 40 through the partially reflecting mirrors to the inputs of the respective variable grating mode devices. The Q and $\bar{Q}$ outputs are produced at output members 15a and 15b, respectively. Here, also as depicted in FIG. 3, the individual output optical images are coupled to the variable grating mode devices by the respective partially reflecting mirrors 11a and 11b. As an illustration of the flip-flop operation, consider the case, S=1, R=0. Assume the variable grating mode device 10a passing the (0, 0) state such that NOR filter 13a passes a "1". Thus, a "1" input is provided to the variable grating mode device 10b, which when coupled with the S=1 input passes the (1, 1) state. Hence, NOR filter 13b passes a "0" to the input of variable grating mode device 10a, as assumed, leading to a stable condition.

The introduction of the variable grating mode system flip-flop has significance due to the fact that it is inherently a parallel processing system. The application of parallel logic systems to image processing tasks has been considered in connection with an electronic system capable of processing small space-bandwidth product images (64 by 64 pixels) as described in a paper entitled "Experience with a Picture Processor in Pattern Recognition Processing" by B. Kruse, AFIPS conference Proceedings, Volume 47, pages 1015-1024 (1978). This reference is of general interest only for information purposes. The teachings therein are not significant with respect to the teachings of this invention.

The variable grating mode logic concept appears to have several advantages over previous proposals for optical logic implementations. One of these is the fully parallel nature of this process. This makes the system ideally suited for image data or page composed input. The parallel processing enables the system to have a high throughput rate, even if the device has a relatively slow cycle time.

In addition, the system operates on input intensities rather than on phase, polarization, position, or some other variable. This provides several direct and indirect advantages. Systems which use position to encode signal level information necessarily sacrifice space-bandwidth product to do so. Polarization and phase modulation schemes require vibration-free coherent illumination systems. Such systems are very susceptible to errors and noise. The variable grating mode arrangement can have completely incoherent input illumination. The readout beam is preferably narrow band and spatially coherent in one-dimension in order to allow spatial filtering of the beam. However, this restriction provides enough freedom to effectively eliminate coherent noise problems. System stability is less of a problem since no coherent detection is required.

The separation of the input and output beams provides another important function, namely a means of maintaining output signal level. Even if the value of the input "1" level varies slightly, the output level can be fixed at a predetermined "1" level, by proper adjustment of the intensity of the readout beam. With the variable grating mode logic approach, the system is made insensitive to input fluctuations by broadening the spatial filter aperture so that the appropriate diffraction order will be transmitted even if the frequency is slightly incorrect.

By the same token, the system is relatively immune to variations in the device characteristics. Small variations in sensitivity or spatial frequency response across the device can be allowed for by making the individual apertures at some particular spatial frequency slightly larger.

Another important aspect of the variable grating mode processor is that the output and input illumination characteristics are compatible. This means that the variable grating mode logic systems can be cascaded with the output of one unit driving the input of the next without the need for any kind of conversion or, as mentioned above, any need for a level restoration.

A final consideration which is of great importance is the ease with which the system can be programmed. Very simple spatial filters (for example, slit apertures) serve to determine the operation of the entire array of logical circuits represented by one variable grating mode device. These filters can be easily changed mechanically or electro-optically to implement different logic operations. This programmable feature distinguishes the variable grating mode approach from prior art implementation and proposed implementations in that the same device can be utilized for numerous functions without resorting to complicated gates and interconnections controlled by an external memory.

Residue processing is also feasible with a variable grating mode device. The concept of optical residue processing has been considered by others using different approaches, see; Alan Huang, Yashito Tsunoda, Joseph W. Goodman and Satoshi Ishihara, "Optical Computation Using Residue Arithmetic", Applied Optics, 18, pp. 149-162 (Jan. 15, 1979). A common feature of prior proposed implementations is that they all use spatial positioning to encode level information, but the drawback of the approach is that it sacrifices space-bandwidth product. Another approach, instead of using position encoding, is to modulate the polarization of the readout beam. This is discussed by: Demetri Psaltis and David Casasent, "Optical Residue Arithmetic: A Correlation Approach", Applied Optics, 18, pp. 162-171 (Jan. 15, 1979); Frank A. Harrigan and William W. Stoner, "Residue Based Optical Programs", SPIE Proceedings, Vol. 85; and A. Tai, I. Cindrich, J. R. Fienup and C. C. Aleksoff, "Optical Residue Arithmetic Computer with Programmable Computation Modules", Applied Optics, 18, pp. 2812-2823 (Aug. 15, 1979). The difficulty with such a system is that it is a phase modulation technique and as such it puts very stringent requirements on the accuracy, uniformity and stability of the system. This system is also limited in the range of operations which can be performed.

The variable grating mode device offers an approach to residue processing which overcomes many of the limitations of previous methods. The variable grating mode device can be used to implement a two-input table look-up, which is the most general approach to residue processing. The table look-up allows implementation of any residue operation over a two-dimensional input. In the implementation of a table look-up for a given modulus m, a means is needed of addressing an m×m matrix which comprises the table. Such a system is the same as that as depicted in FIG. 9a, except that now each input image has m intensity levels corresponding to the m distinct levels in the modulo m processor instead of the two levels associated with the binary processor. Thus, in the spatial frequency domain shown in FIG. 9b, a matrix of m×m points would be addressed. By placing a spatial filter in this plane which stores one of the m different transmission values at each of the m×m addressable points, a modulo m table look-up processor is realized. This processor can operate on the "modulo m planes" (corresponding to bit planes in a binary system) of an entire image in parallel. The stability and accuracy requirements on such a device are relatively low compared to phase modulation techniques. Furthermore, the system is easily programmable in that the function of the two-dimensional array of processors represented by the variable grating mode device can be changed by changing the spatial filter. Since the information encoded on the filter is of relatively low resolution (m×m points where m is about 20), the alignment problems should not be severe.

In practicing this invention using liquid crystal devices, cells may be made employing conventional fabrication techniques for achieving liquid crystal director alignment and cell assembly. The liquid crystal materials must exhibit a variable phase grating property in which the local period is a function of the locally applied voltage. In this respect the invention is neither limited to cell structures nor to liquid crystal materials.

We claim:

1. An optical logic processor employing input optical intensity to output optical spatial position mapping, comprising:

an electro-optical device for receiving discrete input optical object beams each of a first or a second intensity level and for receiving a separate readout optical beam;

means forming a part of said electro-optical device for producing diffracted optical outputs of portions of said readout optical beam, which optical outputs are diffracted to unique spatial positions, each as a direct function of the intensity of one of said input optical object beams or of combinations of the intensities of said input optical object beams; and means including a spatial filter having discrete apertures therein, at said unique spatial positions for transmitting selected portions of said diffracted optical outputs for implementing discrete optical logic functions.

2. An optical logic processor as set forth in claim 1, in which:

said electro-optical device comprises an electrically biased liquid crystal device having liquid crystal material exhibiting a variable phase grating in which the local period is a function of the locally applied voltage.

3. An optical logic processor as set forth in claim 2, in which:

said liquid crystal device comprises a liquid crystal cell activated by a photosensitive structure exposed to said discrete input optical object beams, the intensity of individual ones of said input optical object beams controlling the locally applied voltage to said liquid crystal cell.

4. An optical logic processor as set forth in claim 3, in which:

said liquid crystal device comprises a partially conducting dielectric mirror disposed between said photosensitive structure and said liquid crystal and said optical outputs are reflected by said dielectric mirror.

5. An optical logic processor as set forth in claim 1, in which:

the intensity level of said readout beam is adjusted to control the level of output of said optical processor independent of the input intensity.

6. Apparatus as set forth in claim 1 and including:

an optical system coupling the optical output of said spatial filter to the input of said electro-optical device in a feedback configuration.

7. Apparatus as set forth in claim 1 including:

an additional electro-optical device, and optical means including respective NOR spatial filters for cross coupling the diffracted optical outputs of the respective electro-optical devices as inputs to the opposite electro-optical devices for performing bistable switching operations.

8. A sequential electro-optical logic processor, comprising:

first and second electro-optical devices, each for receiving an input optical object beam and a readout optical beam and producing an output optical beam which is at least a diffracted portion of said readout optical beam diffracted as a function of the intensity of said input optical object beam;

means for coupling a readout optical beam to said first electro-optical device and coupling the output optical beam therefrom as the readout optical beam to said second electro-optical device; and means responsive to the output optical beam from said second electro-optical device including a spatial filter having an aperture therein for transmitting at least one spatial frequency of said last named output optical beam.

9. A sequential electro-optical logic processor as set forth in claim 8, in which:

said electro-optical devices are oriented so as to produce angularly displaced fringe patterns.

10. Apparatus as set forth in claim 9, in which:

said electro-optical devices are oriented so as to produce orthogonal fringe patterns and said spatial filter is provided with apertures in a matrix corresponding to selected two dimensional spatial frequencies.

11. An optical logic processor employing input optical intensity to output optical spatial position maping, comprising:
- an electro-optical device for receiving discrete input optical object beams of different intensity levels and having a separate readout optical beam, said input optical object beams having at least either a first optical intensity level representing a binary "1", or a second optical intensity level representing a binary "0";
- means forming a part of said electro-optical device for producing diffracted optical outputs of portions of said readout optical beam, which optical outputs are diffracted to different unique spatial positions, each as a direct function of the intensity of any one or of combinations of said input optical object beams; and
- means including a binary valued spatial filter having apertures therein, at said unique spatial positions for transmitting selected portions of said diffracted optical outputs for implementing discrete optical logic functions.

12. In an apparatus including an electro-optical device which produces diffracted optical outputs of a readout beam as a function of the intensity of an input optical object beam, the method of implementing digital optical computing and logic functions, comprising:
- coupling discrete input optical object beams, each of a first or a second intensity level, to said electro-optical device in the presence of said readout beam, whereby diffracted portions of said readout beam are projected to unique spatial positions in two dimensional space, each as a direct function of the optical intensity of one, or of combinations, of said discrete input optical object beams; and
- spatially filtering at discrete locations in two dimensional space, selected ones of said diffracted portions of said readout optical beam to implement digital logic and computing functions.

13. An optical logic processor employing input optical intensity to output optical spatial position mapping, for performing binary addition, comprising:
- an electro-optical device for simultaneously receiving three input optical object beams, each having an optical intensity level representing a binary "1" or a binary "0" and for receiving a separate readout optical beam;
- means forming a part of said electro-optical device for producing diffracted optical outputs of portions of said readout optical beam, which optical outputs are diffracted to unique spatial positions, each as a direct function of one of said input optical object beams or combinations of the intensities of selected input optical object beams; and
- means including a spatial filter having a first aperture at a spatial position for passing a diffracted optical output when one input optical object beam is at an intensity level representing "1" and having a second aperture at a spatial position for passing a diffracted optical output when all input optical object beams are at intensity levels representing "1".

14. An optical logic processor employing input optical intensity to output optical spatial position mapping, for performing full binary addition comprising:
- an electro-optical device for receiving discrete input optical object beams each of a first or a second intensity level and for receiving a separate readout optical beam;
- means forming a part of said electro-optical device for producing diffracted optical outputs of portions of said readout optical beam, which optical outputs are diffracted to unique spatial positions, each as a direct function of the intensity of one of said input optical object beams or of combinations of the intensities of said input optical object beams;
- means including a spatial filter arrangement having first and second apertures in the positive frequency half-plane for passing the diffracted optical outputs representing the sum bits when only one or all three of the input optical objects are at intensity levels representing "1", respectively, and having first and second apertures in the negative frequency half-plane for passing the diffracted optical outputs representing the carry bits when any two or all three of said input optical objects are at intensity levels representing "1", respectively; and
- respective optical systems associated with the positive and negative frequency half-planes for receiving and spatially separating the optical outputs from said spatial filter arrangement.

* * * * *